United States Patent

[11] 3,616,126

| [72] | Inventor | Barry F. Tungseth<br>St. Paul, Minn. |
| [21] | Appl. No. | 772,669 |
| [22] | Filed | Nov. 1, 1968 |
| [45] | Patented | Oct. 26, 1971 |
| [73] | Assignee | Minnesota Mining and Manufacturing Company<br>St. Paul, Minn. |

[54] COMPRESSION ENERGY ABSORBING STRUCTURE
11 Claims, 7 Drawing Figs.

[52] U.S. Cl. .................................................. 161/53,
5/344, 156/166, 156/179, 161/69, 161/116, 161/122, 161/142, 161/165, 272/60, 293/71
[51] Int. Cl. ........................................................ B32b 7/08
[50] Field of Search ............................................ 161/43, 53, 69, 116, 122, 142–144, 239, 59, 60; 248/358; 272/60; 52/230; 5/344; 293/71, 84, 88, 98; 156/166, 177, 178, 179, 276

[56] References Cited
UNITED STATES PATENTS

| 2,624,596 | 1/1953 | Clingman | 293/71 X |
| 2,753,573 | 7/1956 | Barker | 161/142 X |
| 2,762,739 | 9/1956 | Weiss | 161/142 X |
| 2,872,690 | 2/1959 | Neisler et al. | 161/142 X |
| 3,085,922 | 4/1963 | Koller | 156/166 X |
| 3,138,506 | 6/1964 | Ross | 161/142 X |
| 3,328,218 | 6/1967 | Noyes | 161/53 X |
| 3,362,032 | 1/1968 | Summers | 5/344 X |

*Primary Examiner*—John T. Goolkasian
*Assistant Examiner*—Joseph C. Gil
*Attorney*—Kinney, Alexander, Sell, Steldt & Delahunt

ABSTRACT: A padlike structure for absorbing compressive forces comprising two elastomeric sheets disposed in substantially parallel relationship and interconnected by closely spaced polymeric filament segments disposed normal to the plane of the structure. The structure absorbs and stores energy imparted to it by means of a loading head, either the head or the structure having a convexly curved surface.

PATENTED OCT 26 1971 3,616,126

INVENTOR.
BARRY F. TUNGSETH
BY Kinney, Alexander,
Sell, Steldt & De La Hunt
ATTORNEYS

COMPRESSION ENERGY ABSORBING STRUCTURE

BACKGROUND OF THE INVENTION

The present invention relates to energy-absorbing structures or pads to absorb the compressive forces of shocks, vibrations, etc.

Most prior art shock absorbers utilize metallic springs, interleaves, or composite layers of rubber or foam plastics. Pads such as gymnastic mats utilize rubber, foam plastics or specially woven fabrics. A few prior art devices such as McGuire, U. S. Pat. No. 2,189,813 and Cummings, U. S. Pat. No. 1,759,976, are directed to thin absorption pads suitable for use as innersoles or welts for shoes.

McGuire utilizes pneumatic air cells formed in a filler or body material encased between two elastic sheets. The sheets are cemented to the filler under tension and allowed to shrink after application in order to minimize deformation of the cells. The sheets distort and compress the cells when a compressive load is applied and return the cells to their original configuration when the load is removed.

Cummings shows a compression-absorbing pad comprised of woven pile fibers impregnated by a flexible resinous binder. The impregnated fibers bind the backing sheets or webs firmly to the structure to make a comparatively thin pad, the binder giving it flexible characteristics.

Pads of this nature, however, are primarily directed to shoe construction and are not adaptable for the purpose of absorbing compression forces in a variety of applications.

Nickerson, U. S. Pat. No. 3,304,219, shows energy-absorbing material comprised of a series of movable polymeric spherical particles applied to a series of layers. The Nickerson invention requires multiple layers of backing sheets with the spherical particles disposed between the layers.

SUMMARY OF THE INVENTION

The instant invention is directed to a vibration and shock energy absorbing structure or pad that can be used in a wide range and variety of applications. It may, for example, be used as a bumper type of absorber on loading and marine docks, in cargo-carrying vehicles, etc.; as a mount for heavy machinery or to absorb vibrations in parts of machinery.

The pad utilizes a columnar structure comprised of polymeric monofilaments or fibers disposed between two elastomeric films or backing sheets. The opposing ends of each monofilament are embedded in the sheets and extend transversely between them in substantially normal attitude to interconnect the sheets. A loading or compression force is applied to the pad either by means of a spherical or convexly curved surfaced loading head attached to one of the sheets or by shaping one sheet in essentially convex or arcuate contour and applying the load directly to the convex surface of the sheet. The convex contour of the loading head or the arcuately shaped sheet allows the area of compression to progressively increase in both size and depth of penetration during application of the force. During initial application the filaments immediately below the area being stressed momentarily resist the force. Continued application overcomes the buckling resistance of the individual filaments. The filaments are deflected from their normal attitude to the sheets. At the moment the buckling resistance of each filament is overcome the filament absorbs some of the energy exerted by the compression force. After initial deflection, the filament no longer effectively resists the force or absorbs its energy. The buckling process consecutively progresses to additional filaments as the area of compression increases in size and depth. After the filaments have buckled, the elastomeric backing sheet distorts by stretching over the deflected filaments and continues to supply resistance to the compression force by storing the energy exerted by the force over the deflected filaments. Upon release of the force, the elastic properties of the sheet returns the sheet and filaments to initial position.

The pad has several advantages. It can be mass produced in continuous webs and rolled or cut into large rolls or sheets for storage thereby reducing costs of manufacture. After manufacture individual pads can be cut from stock into any desired size or shape. The device does not utilize any metallic or mechanical parts and is made of electrically nonconductive materials. Its operation is highly efficient as it is capable of absorbing loads equivalent to the load capacity of more expensive and complex shock and vibration absorbers. The structure or pad can be designed to handle high-amplitude and low-frequency loadings which heretofore required absorbers of complex and costly structure. Additionally, the filaments form a columnar structure of closely separated thin columns through which air or coolant liquids can be circulated.

DESCRIPTION OF THE DRAWINGS

Understanding of the invention will be facilitated by referring to the accompanying drawings in which like numerals refer to like parts in the several views and in which.

DETAILED DESCRIPTION

Figure 1:
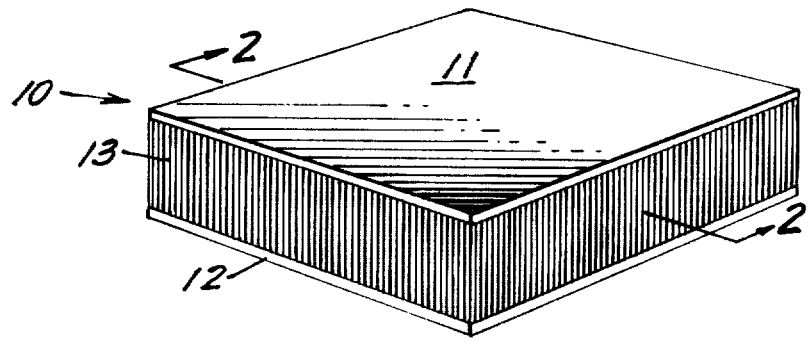
FIG. 1 is a perspective view of a preferred form of the energy absorption structure.
Figure 2:
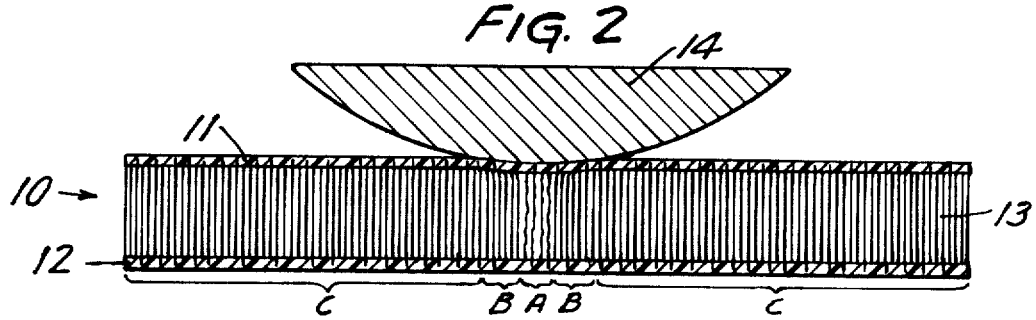
FIG. 2 is a sectional view along the lines and in the direction of the arrows 2—2 of FIG. 1 with a convex surfaced loading head applying an initial compression force to one surface of the structure, the loading head also in section.
Figure 3:
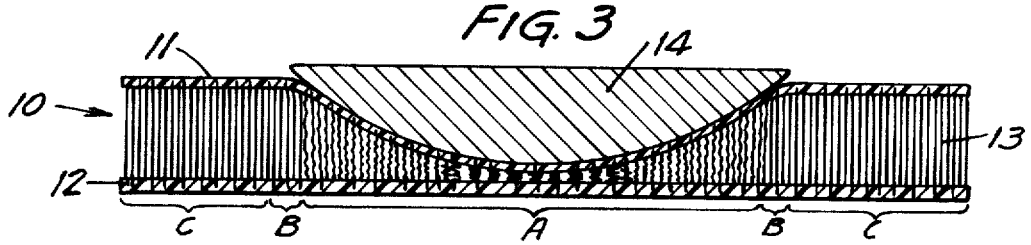
FIG. 3 is a sectional view similar to FIG. 2 but with the loading head applying a substantially full compression force to one surface of the structure.

Referring to FIGS. 1–3 it is seen that the absorption pad generally designated 10 comprises two elastomeric films or backing sheets 11 and 12. Sheets 11 and 12 are planar sheets formed of polyurethane, vinyl plastisol or other elastomers well known in the art which provide the requisite elastic properties. For most applications to which this invention may be adapted, it is preferred that the elastomeric sheets receiving the compressive force have a Shore D hardness of less than 100.

If desired the base or bottom backing sheets 12 may be made of a different elastomer than sheet 11; or sheet 12 may be of nonelastic epoxy resin, vinyl polyester or other similar polymeric material. If desired, sheet 12 may be constructed of nonpolymeric material such as fabrics, wood, metal, concrete, etc.

Sheets 11 and 12 are uniformly spaced from each other and interconnected by a plurality of polymeric monofilaments or filaments 13, the opposing ends of each individual filament 13 being embedded in or otherwise suitably secured to sheets 11 and 12. Filaments 13 are of uniform length and diameter and extend transversely across the interspace between sheets 11 and 12 at substantially normal attitudes to the surface of the sheets and form a plurality of thin interconnecting columns.

In producing pad 10 one of the sheets 11 or 12 is formed by coating a self-curing liquid elastomeric resinous layer such as urethane on a planar carrier, backing member or support. Before the layer solidifies one end of the filaments is embedded therein so that the filaments maintain a normal attitude to the sheet. The filaments may be embedded manually or by electrostatic or mechanical beating methods. After the resinous coating has solidified and the filaments are adhered, the sheet is inverted so that the free ends of the filaments can be dipped or embedded into a second resinous self-curing liquid coating which forms sheet 12. To secure the filaments, it is preferred to embed their tips a substantial distance into the coating which preferably ranges from one thirty-second to one-eighth inch in thickness. If desired, sheets 11 and 12 may be of different thickness. After the second coating has solidified or cured, the pad is complete. If made in large sheets, the material may be stored or cut into small segments to form individual pads such as shown in FIG. 1.

Alternatively sheets 11 and 12 may be preformed and filaments 13 individually bonded or otherwise secured to their surfaces, e.g., through an intervening coating of adhesive, to form the thin interconnecting columns.

Figure 4:
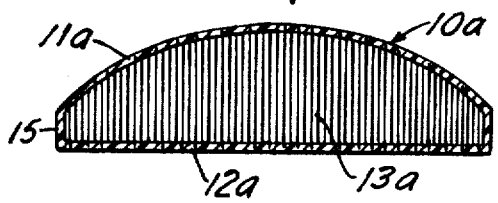
FIG. 4 is a sectional view of a modified form of structure.
Figure 5:
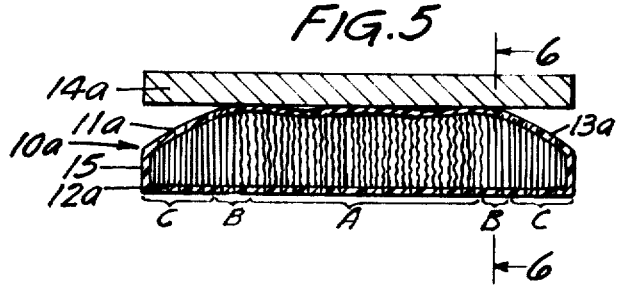
FIG. 5 is a sectional view of the structure of FIG. 4 with a planar loading head applying a compression force substantially coextensive with the entire upper surface of the structure.

If desired to form a pad having an arcuate cross section such as shown in FIGS. 4 and 5, the filaments are first affixed to a coating of resin (with or without elastic properties) coated over a flat carrier or support as described above. The free ends of the filaments are then suitably cut so that the cut ends correspond to the desired arcuate contour. The ends are embedded in a second and elastomeric resinous coating carried by a convex or dish-shaped die or carrier in which the inner surface conforms to the desired contour of the upper surface of the pad. The resinous coating is sufficiently fluid to accept and flow around the free ends of the filaments while being sufficiently viscous to remain in uniform depth prior to contact with the filaments ends.

As best visualized in FIGS. 2 and 3, the compressive force applied to the planar backing sheets 11 or 12 is exerted through a loading head 14 which may be suitably secured to sheet 11. The surface area of head 14 which contacts sheet 11 is of convex contour in relation to the sheet. It forms an essentially three-dimensional curved surface. It may be spherical or eccentrically curved in various or desired configurations to form a mathematically defined quadric curve, the segment of the curve-contacting sheet 11 always being in convex relationship thereto. For purposes of definition head 14 shall hereafter be referred to as a quadric loading head, it being understood this definition shall include any three-dimensional convexly curved surface including spherical surfaces.

The load or compressive forces to be absorbed, such as the vibrations of heavy machinery, are transferred directly onto the upper surface of quadric head 14. The surface may have suitable attaching means connected to the mounts of the machine. Conversely, in event the compressive force to be absorbed can be exerted through quadric members integral with the device or machine exerting the force, such as quadric mounts for machinery, metal bumpers placed on mobile freight loading equipment, etc. head 14 can be eliminated as the force is applied directly to pad 10 by the device per se.

The contour of quadric head 14 allows penetration into the pad in progressively increasing increments. As seen by comparing FIGS. 2 and 3, as penetration increases, a progressively greater surface area of the elastomeric backing sheet 11 is exposed to and contacted by the quadric head and an additional group of filaments 13 exposed to the compressive force. The purpose of quadric head 14 is thus to apply the compressive force over a continually increasing area of the pad until the force has been completely dissipated by the combined resistance of filaments 13 and elastomeric sheet 12.

The size, diameter, and/or shape of quadric head 14 depends upon the particular application for which the pad will be used, the larger heads absorbing greater loads. In testing various pad constructions, it was found that a pad utilizing a spherical loading head 8 inches in diameter can absorb loads two to three times as large as the same pad utilizing a head of only 4 inches in diameter. Quadric head 14 may be constructed of polymeric material, metal or other suitable rigid materials.

As seen in FIGS. 1–3, filaments 13 form an interconnecting columnar structure and resist the compressive force in the manner of collapsing columns, i.e., by initially resisting and subsequently buckling under the force. In selecting filaments 13 for this purpose, solid polymeric filaments of nylon or polyester in uniform lengths ranging from one-fourth inches to 1½ inches and uniform diameters ranging from 0.005 inches to 0.025 inches or more are preferred for constructing pads for most energy absorbing applications. Polymeric filaments with dimensions within these ranges have relatively minute diameters as compared to their lengths. They will not fracture or permanently deform when buckled under the compressive force and will return to normal attitude without attendant damage when the force is removed. The ratio of filament length to filament radius of gyration, i.e., the slenderness ratio of these filaments (computed from the standard slenderness ratio formulas for columns where the slenderness ratio $= (1/k)$ ; $k$ being the least radius of gyration of the filament and $l$ being the length of the filament), ranges from about 80 to slightly in excess of 800.

Solid polymeric filaments with slenderness ratios within these ranges have the requisite buckling resistance characteristics for the energy-absorbing structures contemplated by this invention. In selecting filaments of the above dimensional ranges for particular energy-absorbing applications, the buckling resistance of the individual filament is first determined. Filament buckling resistance can be computed from Euler's formulas for thin columns which have both ends rigidly affixed to prevent rotation. The formulae is stated as:

$P=(4\pi^2 IE)/l^2$ $P =$ buckling resistance $I =$ moment of inertia ($0.049d^4$: where $d =$ diameter of the filament)

$E =$ modulus of elasticity of the filament $l =$ length of the filament

To determine the total buckling resistance per square inch of pad surface, the buckling resistance of the selected individual filament is multiplied by the density or number of filaments per square inch. The density of filaments can be varied to meet the requirements of the desired absorption application by utilizing the buckling resistance of the individual filaments as the base factor. The product of the filament buckling resistance multiplied by the density of filaments per unit area can be suitably equated with the distortion resistance or energy storing capacity of sheet 11 to produce pads designed to handle the desired compression load.

Pads 10 with substantially uniform filament densities ranging from between 250 to 2,000 filaments per square inch of pad surface are adequate for most applications. Density will be controlled to a slight degree by the diameter of filaments used. For example, pads utilizing filaments of 0.025 inch in diameter are easily constructed with filament densities up to 400 filaments per square inch. Pads utilizing filaments of 0.017 and 0.010 inch diameters show good absorption characteristics when the filaments are applied to the backing sheets in densities of 450 and 1,500 filaments per square inch respectively.

Table I shows the slenderness ratio and buckling resistance of various sizes of commercially obtainable solid nylon filaments. Filaments selected from table I have been found to be highly acceptable for use as filaments 13 for most energy-absorbing applications although for loads requiring extremely high amplitude, filaments up to 1½ inches in length can be used. Buckling resistances were determined by using Euler's formulas. Some of these determinations were checked by submitting 1 square inch urethane sheets interconnected by nylon filaments, with the dimensional characteristics of table I randomly selected, to standardized testing procedures for computing compressive properties of rigid plastics (ASTM–0D695 ). Buckling resistances determined by the ASTM procedure showed very high correlations with resistances computed by Euler's formulae.

TABLE I

| Filament diameter in inches | Filament length in inches | Buckling resistance [1] | Slenderness ratio $\frac{1}{k}$ |
|---|---|---|---|
| .005 | 1/2 | .0012 | 400 |
| .005 | 5/8 | .0008 | 500 |
| .005 | 3/4 | .00056 | 600 |
| .005 | 1 | .00031 | 800 |
| .008 | 1/2 | .008 | 250 |
| .008 | 5/8 | .005 | 312 |
| .008 | 3/4 | .0037 | 375 |
| .008 | 1 | .0021 | 500 |
| .010 | 1/2 | .02 | 200 |
| .010 | 5/8 | .013 | 258 |
| .010 | 3/4 | .007 | 300 |
| .010 | 1 | .005 | 400 |
| .012 | 1/2 | .04 | 167 |
| .012 | 5/8 | .028 | 208 |
| .012 | 3/4 | .020 | 275 |
| .012 | 1 | .011 | 333 |
| .017 | 1/2 | .17 | 118 |
| .017 | 5/8 | .108 | 147 |
| .017 | 3/4 | .075 | 177 |
| .017 | 1 | .042 | 235 |
| .021 | 1/2 | .4 | 96 |
| .021 | 5/8 | .25 | 120 |
| .021 | 3/4 | .18 | 143 |
| .021 | 1 | .097 | 188 |
| .025 | 1/2 | .78 | 81 |
| .025 | 5/8 | .50 | 100 |
| .025 | 3/4 | .35 | 120 |
| .025 | 1 | .195 | 160 |

[1] Of individual filaments in pounds, the resistance derived from euler's Formulae.

Each filament 13 absorbs a portion of the energy exerted by quadric head 14. On initial stressing by head 14, the filaments remain in normal attitude. Continued stressing of the load overcomes the buckling resistance of filaments 13 and the filaments commence to buckle or deflect from their normal attitude. At the moment of initial deflection, each filament absorbs a portion of the energy exerted by head 14 and converts the energy to heat. Once the filament is deflected slightly from normal (10 to 20 degrees) no significant additional energy is absorbed although the filament continues to buckle. The buckling resistance is therefore a tangental function and drops rapidly after initial deflection.

Table II shows the amount of kinetic energy absorbed by four different pads each constructed with nylon filaments and urethane elastomeric backing sheets of the stated dimensions. Kinetic energy was applied by a free-falling 5-lb., 3-inch steel sphere dropping through the stated weight drop distance onto the elastomeric sheet which distance is found by trial and error to compact each pad to its point of maximum amplitude and energy absorption capacity, i.e., to the point just prior to complete compression of the central group of filaments and complete transmission of energy through the pad. Input kinetic energy was computed by measuring the distance of sphere drop, i.e., to its point of initial contact with the elastomeric sheet. Stored energy in the elastomeric sheet was determined by measuring the rebound distance of the sphere after impact. Rebound distance is the distance the sphere was rebounded above the upper elastomeric sheet, the measurement based upon the position of the sheet in unstressed condition such as sheet 11 in FIG. 1. Energy values can easily be determined from the standard formulae E = WD (where E = kinetic or stored energy; W = the weight of the sphere; and D = the distance of sphere drop or rebound in feet). The energy absorbed by the filaments is the difference between the input kinetic energy and the stored energy.

The table shows the proportional amounts of energy collectively absorbed by the filaments upon initial buckling and the energy stored by the elastomeric backing sheet. The amount of energy collectively absorbed by the filaments in this example averaged about twice the amount of energy stored by the elastomeric sheet.

In absorbing a compression force pad 10 operates as follows: FIG. 2 shows the position of pad 10 as the force of the load is first applied. The filaments in the area designated by the bracket A immediately below the load exerted onto elastomeric sheet 11 by head 14 have initially resisted the load and subsequently started to buckle as the force of the load overcomes their buckling resistance. Head 14 commences a depression of sheet 11 by stretching it along the surface area of the head. The A area filaments have absorbed energy during initial buckling but no longer afford any significant resistance to the force or absorb its energy although buckling continues. Filaments in the area designated by brackets B continue to initially resist the load which is stressing sheet 11 immediately above them although some may commence buckling and absorb energy. Filaments within the area designated by brackets C have not yet been exposed to the loading force and in their normal attitude tend to resist any stretching of sheet 11 immediately above.

If desired the pad may be used to support a static load by means of the initial resistance of the filaments. A static load approximately equal to the collective buckling resistance of the A area filaments of FIG. 2 may be applied through head 14, e.g. the weight of head 14 plus the static weight of the source of compression forces such as a portion of vibrating equipment at rest. The weight of the static load is transmitted through the pad onto a supporting surface. Once the weight is converted to a dynamic load (i.e., turning on the equipment and producing vibrations) the compression forces of the vibrations will immediately overcome the buckling resistance of the A area fibers and the pad will commence to absorb the dynamic forces of the load.

Turning now to FIG. 3, head 14 is seen as fully depressed or penetrated into pad 10 by the loading force which at this point has been substantially dissipated by absorption action of the pad. As head 14 depressively penetrates the pad from the position of FIG. 2 to that of FIG. 3, A area filaments 13 function as a series of progressively collapsing columns. The filaments initially resist the force applied to the quadric head and then buckle concentrically in consecutive radial order as the force overcomes their buckling resistance. Upon initial buckling they absorb energy. A few filaments within the B area of FIG. 3 are in a state of initial buckling and are absorbing energy of the compressive force. Others remain in substantially normal position and continue to resist compression as their buckling resistance has not been overcome.

When the pad is in the position of FIG. 3 elastomeric sheet 11 has been distorted by the stress of the load and is depressed and penetrates a substantial distance into pad 10 by stretching under head 14. The elastic properties of sheet 11 continue to resist the compression force applied to the head during the sheet's stretching or elongation which commences immediately after filaments 13 have buckled. By comparing the extent of penetration of head 14 in FIGS. 2 and 3, it is seen that during elongation sheet 11 resists the compression force in the areas designated by brackets A after these filaments have buckled and no longer afford resistance. In practicing the invention it is preferred that the buckling resistance of filaments 13 and the elastic properties of sheet 11 of a given pad allow substantial amplitude or penetration of sheet 11 when the pad is exposed to the maximum load for which it is intended to be used. Preferably the maximum load or force to be exerted upon sheet 11 in a given application should depress the sheet by elongating or stretching it a distance equal to 92–95 percent of the free length of the filaments. In this connection it should be

TABLE II

| Pad No. | Filament length in inches | Filament diameter in inches | Urethane backing sheet thickness in inches | Distance of weight drop in feet | Input kinetic energy in foot lbs. | Energy stored by backing sheet in foot lbs. | Energy absorbed by filaments in foot lbs. |
|---|---|---|---|---|---|---|---|
| 1 | 3/4 | .012 | 1/8 | 2.3 | 11.7 | 3.2 | 8.5 |
| 2 | 3/4 | .017 | 1/8 | 3.5 | 17.6 | 5.5 | 12.1 |
| 3 | 5/8 | .008 | 1/16 | 1.2 | 5.9 | 2.0 | 3.9 |
| 4 | 5/8 | .017 | 1/16 | 2.9 | 14.7 | 4.7 | 10.9 | noted that in event the pad is overloaded and sheet 11 "bottoms" or penetrates the entire internal thickness of pad 10, the overlaoding force will not rupture fibers 13 or otherwise damage the pad.

Preferred stretching or elongation of sheet 11 during maximum loading should be an average of about 10 percent greater than its undistorted surface area, the lower most point of penetration, such as in FIG. 3, providing an elongation of about 20 percent. Urethane elastomeric sheets 1/32 and 1/8 inch-thick having a respective modulus of elasticity of 3.2 and $3.5 \times 10^5$ p.s.i. have been found to possess satisfactory elongation properties.

It is understood that sheet 12 need not have the same elastic properties as sheet 11. The quadric loading head in most situations is applied only to the upper sheet. In some cases it may be desired to apply loads simultaneously or in consecutive order by means of quadric heads affixed to the surfaces of both sheets 11 and 12. In such case, both sheets must have the requisite elastic properties for the desired application. Further, sheet 12 may be bonded to additional backing members having some absorption capacity in order to dampen any minimal compression forces transmitted through pad 10 during operation. Also pads in which both sheets 11 and 12 have the requisite elastic properties may be mounted in superimposed relationship to form a structure comprising a series of pads for absorbing extra heavy loads.

Referring to the position of quadric head 14 in FIGS. 2 and 3 it is seen that when the head is in either of these positions the filaments in the areas designated by brackets C retain their vertical positions and tend to stabilize sheet 11 and resist any distortion by stretching adjacent the periphery of the discrete area under compression. In determining optimum characteristics of sheet 11 it was found that by utilizing sheets of different thickness, varying degrees of distortion resulted. In some cases the distortion deflected a few of the C filaments from their normal attitude reducing their effectiveness to resist stretching. Further, deflected C area filaments offer no effective buckling resistance to the load as penetration of the head increases and transforms C area filaments into B or A area filaments (compare FIGS. 2 and 3). Deflection greatly reduces or eliminates their resistance to buckling and thus their ability to absorb energy.

Thicker sheets tend to disorient filaments in the C area much more readily than thinner sheets. Thicker sheets are stronger and have less elasticity. They tend to overcome the resistance of the C area filaments to remain vertically oriented and thus "pull" the filaments from normal attitude in the area adjacent the periphery of the loading head. To produce pads with optimum absorption characteristics the buckling resistance of the filaments should be correlated with the elastic properties or thickness of the elastomeric sheet 11. Ideally, the buckling resistance of B area filaments should be less than the force required to stretch sheet 11 over the C area filaments. Filaments in the B area will then buckle under the loading force before the sheet commences to stretch in the C area disorienting the C filaments. The latter filaments remain in normal attitude adding resistance to distortion of sheet 11. B area filaments will initially resist and then buckle (thus converting to A area filaments and absorbing energy) under the loading force.

Sheet 11 will therefore stretch or elongate over the buckled filaments in a smooth progressive "flow" until the compression force is dissipated.

Table III gives the critical dimensions of a number of illustrative impact absorption pads designed with optimum physical characteristics to handle the stated maximum loads measured in pounds. The urethane backing sheet of each pad was constructed of optimum thickness for the particular application in order to reduce distortion over C area fibers and retain maximum resistance to the load after the A area filaments had buckled. Solid nylon filaments were selected in the stated sizes, slenderness ratios and buckling resistances for each pad in order to provide optimum absorption of energy of the loads which the respective pad was designed to handle. Loads were applied to the upper urethane backing sheet of pads 6 × 6 inches in size or greater by means of a quadric or spherical loading head 8 inches in diameter.

During stretching or elongation, the elastomeric sheet 11 stores energy exerted by the compression force. Upon release of the force, the stored energy is returned to the loading head and causes sheet 11 to return from its position in FIG. 3 to that of FIG. 1. Upon return, sheet 11 assists buckled filaments 13 to reorient to normal attitude. Since their elastic limit has not been exceeded, the sheet and filaments are then again in condition to offer full resistance to subsequent impacts.

Table IV shows the amount of energy stored during stretching or elongation of the elastomeric sheet by two exemplary pads constructed of elastomeric urethane backing sheets of the stated thickness and utilizing 3/4 inches nylon filaments 0.012 inch in diameter. Stored energy was determined by dropping a 5-lb., 3-inch steel sphere through the stated weight drop distances (the distances being found by trial and error under controlled conditions) onto the upper urethane sheet of the pads. The input kinetic energy applied by the sphere falling through the stated distances compacted each pad to its point of maximum amplitude and energy absorption capacity, i.e., to the point just prior to complete compression of the central group of filaments and complete transmission of energy through the pad. Input kinetic energy value was determined by applying the standard formulas E = WD (where E = kinetic energy in foot pounds; W = weight of sphere in pounds; and D = distance of weight drop in feet, to point of initial contact with the elastomeric sheet) to the weight of the sphere and distance of drop. Stored energy was determined by measuring the rebound distance of the sphere after impact. Rebound distance is the distance the sphere was rebounded above the elastomeric sheet, the measurement based upon the position of the sheet in unstressed condition such as sheet 11 in FIG. 1. The value of the stored energy was computed by multiplying

TABLE III

| Pad number | Maximum loading capacity in pounds | Filament diameter in inches | Filament length in inches | Slenderness ratio of individual filaments | Individual filament buckling resistance in pounds | Thickness of urethane elastomeric sheet in inches |
|---|---|---|---|---|---|---|
| 1 | 20 | .005 | 5/8 | 500 | .0008 | 3/32 |
| 2 | 50 | .006 | 1/2 | 333 | .0025 | 1/16 |
| 3 | 100 | .008 | 5/8 | 312 | .005 | 3/16 |
| 4 | 250 | .010 | 1/2 | 200 | .02 | 1/16 |
| 5 | 500 | .017 | 3/4 | 177 | .075 | 1/8 |
| 6 | 750 | .021 | 3/4 | 143 | .18 | 1/8 |

TABLE IV

| Pad Number | Thickness of urethane elastomeric sheet in inches | Weight drop distance in feet | Input Kinetic energy in foot pounds | Weight rebound distance in feet | Stored energy of elastomeric sheet in foot lbs. | Energy absorbed by fibers in foot pounds |
|---|---|---|---|---|---|---|
| 1 | 1/32 | 1.2 | 5.9 | .3 | 1.5 | 4.4 |
| 2 | 1/16 | 2.3 | 11.7 | .8 | 4.0 | 7.7 | the weight of the sphere in pounds by the distance or rebound in feet. Energy absorbed by the filaments is the difference between the input kinetic energy and the stored energy.

As seen, both sheets store energy, the thicker sheets having the greater storage capacity. However, sheet thickness cannot greatly exceed the optimum ranges suggested in table III, otherwise sheet 11 will distort adjacent the force area and disorient C-area fibers as discussed above.

The compression force applied by head 14 is dissipated by the cumulative buckling resistance of filaments 13 (i.e., their cumulative absorption of energy on initial buckling) and the resistance of elastomeric sheet 11 to distortion or stretching over A and B area filaments (i.e., the cumulative storage of energy by the sheet). The resistances acting in concert respectively absorb and store substantially all of the energy exerted by the compression force onto pad 10.

Although pads constructed with filaments and backing sheets in the exemplary sizes described above are preferred for most compression energy absorbing applications, there are certain situations where it may be desired to construct pads of extremely small size, e.g., absorbing minute vibrations in precision measuring equipment, miniaturized scientific equipment, etc. Pads with filament lengths under one-fourth inch and elastomeric sheets in thickness under one thirty-second inch utilizing quadric heads of appropriately reduced diameters may be constructed. In constructing small-sized pads, care must be taken to be certain that the slenderness ratio of the filaments is within the ranges discussed above and the thickness of the elastomeric sheet to which the force is applied is controlled so as not to disorient the C-area filaments and yet firmly anchor the filaments.

Performance tests show that pads constructed generally in accordance with the examples shown in FIGS. 1–3 and discussed above are highly efficient in absorbing forces ranging from as little as about 10 lbs. to over 900 lbs. per square inch. Tests of vibration damping to determine the vibrational energy transmitted through various pads showed excellent damping capacity. The pads were exposed to an accelerating load using an 80-pound air hammer capable of accelerating a noninsulated reference table with a force of 12 G's as measured with an accelerometer. When pads 10 with quadric heads 14 ranging between 4 and 8 inches in diameter were inserted between the hammer and table, the acceleration levels transmitted to the table were reduced to levels within the range of 0.3 to 1.5 G's.

Another advantage resides in the fact the thin columnar structure formed by filaments 13 allows cooling fluids and air to be freely circulated between backing sheets 11 and 12. Reciprocal distortion or movement of sheet 11 caused by the application of a vibrating or reciprocating force increases the air circulation. The reciprocal distortion of sheet 11 in effect pumps air through the columnar structure. If additional cooling facilities are needed liquid coolants may be suitably pumped through and/or by the structure.

Figure 7:
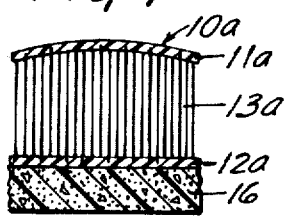

In certain applications it may not be feasible to utilize a quadric loading head such as head 14. In such situations one of the elastomeric sheets is formed in an arcuate contour as shown in the modifications of FIGS. 4 and 7 so that a planar loading force may be applied directly to the pad.

In this embodiment the pad, generally designated 10a, has an elastomeric sheet 11a formed in arcuate contour and a sheet 12a in planar contour. Fiber 13a are cut in different increments of length and oriented normal to the planar sheet 12a so that the longest fibers are disposed under the apex of sheet 11a and the shorter fibers disposed in decreasing gradients of length toward the edges of the pad. If desired an elastomeric sheath 15 may be integrally formed with sheets 11a and 12a to fully encase filaments 13a. The physical characteristics of the elastomeric sheet 11a and the selection of filaments 13a are essentially the same as described with reference to FIGS. 1–3 although the filaments of each pad vary in length and their buckling resistances are computed accordingly. The most expedient method of manufacturing pads 10a is to use filaments of uniform diameter. However, for certain applications filaments of different diameters may be used, e.g., the longer filaments under the apex of the curve of sheet 11a having greater diameters than the shorter filaments at opposing edges of the pad and vice versa.

As seen in FIG. 5, the compression force is applied by means of a planar loading bar 14a pressed directly against the exposed surface of arcuate sheet 11a. In FIG. 5 the linear dimensions of head 14 a are substantially equivalent to the length and width of pad 10a so that the compression force is applied coextensively over the pad. As the compression force presses planar head 14a toward the base of the pad, sheet 11a is compressed and deforms or restricts from its normally arcuate contour. Under compression sheet 11a exhibits a rippling and forms a sinuous contour to compensate for its deformation. Filaments 13a enclosed by the A bracket have buckled and absorbed some of the energy of the force during initial deflection from their normal attitude in relation to sheet 12a and the contacting surface of head 14a. As can be visualized by comparing FIG. 4 and 5 the longer filaments within the A bracket directly under the apex of sheet 11a buckle first. Buckling continues in consecutive order toward the opposing edges of pad 10a as the shorter fibers in progressively decreasing gradients of length initially resist and buckle under the compression force. After the A filaments have buckled sheet 11a is compressed over them by head 14a. During compression sheet 11a is deformed into the sinuous contour of FIG. 5 to produce a continuum of opposing stressed areas which store some of the energy exerted by the compression force and return sheet 11 a to its normal arcuate contour upon release of the force. As in the operation of the pads of FIGS. 1 –3, some of the filaments within the B brackets continue to resist the force and others are in the initial stage of buckling and absorb energy exerted by the compression force. Filaments within the C brackets remain in normal attitude to resist distortion of sheet 11a.

Figure 6:
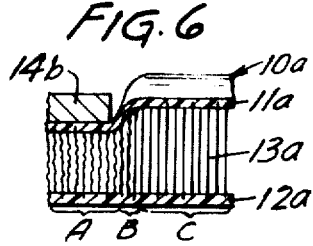
FIG. 6 is a fragmentary sectional view along the lines and in the direction of the arrows 6—6 of FIG. 5 but with a planar loading head applying a compression force to only a portion of the upper surface of the structure; and, FIG. 7 is a view of a segment of the structure of FIG. 4 affixed to a substrate.

FIG. 6 shows pad 10a compressed by means of a planar rectangular loading head 14b which transversely compresses only a portion of the pad as distinguished from the coextensive loading just described. The behavior of filaments 13a directly below head 14b is the same as shown and described with reference to FIG. 5. However, there is no significant rippling of sheet 11a during distortion.

Considering the filaments when viewed from FIG. 6, some of the A-bracket filaments are identical to those shown in FIG. 5. All A-area filaments have buckled under the compression force. Some of the filaments within the B-bracket adjacent the buckled A-fibers are in the initial stages of buckling and are absorbing energy, others remain in normal position and continue to resist the force. Filaments within the C bracket resist distortion of sheet 11a. Sheet 11a stretches adjacent the longitudinal edges of head 14b and over the A-area filaments as shown in FIG. 6 to store energy exerted by the force. Upon release of the force the stretched sheet returns to its normal arcuate contour. As explained with reference to the embodiments of FIGS. 1 and 3, the thickness of sheet 11a of the embodiments shown in FIGS. 4 –6 cannot greatly exceed the ranges suggested in Table III in order to prevent undue disorientation of the C-area filaments.

If desired the coextensive loading explained with reference to FIG. 5 may be combined with the partial loading shown in FIG. 6. The contacting surface of planar loading head 14a may be formed with a series of embossed ridges. As the head is pressed coextensively over arcuate sheet 11a, the embossed ridges perform as a partial loading head similar to head 14b in FIG. 6 in advance of the flat surface area of head 14a.

Pads 10 or 10 a can be easily mounted on a permanent substrate such as the walls and corners of a building, loading dock, etc. or the walls and door areas of cargo carriers and the like. FIG. 7 shows a segment of pad 10a bonded to a concrete base or substrate 16. A completely assembled pad may be easily mounted thereon by suitably bonding sheet 12a to substrate 16. If desired sheet 12a may be eliminated and filaments 13a suitably bonded directly onto substrate 16, the free portion of the filaments above the surface of the substrate being within the length ranges discussed herein. A still further modification may be constructed be designing a pad for use with a quadric loading head, such as pad 10, and assembling the pad directly over substrate 16. Filaments 13 are first affixed to elastomeric sheet 11. A self-curing resinous layer with appropriate bonding agent may then be coated over the surface of substrate 16 and the free ends of the filaments of sheet 11 embedded in the layer and the layer allowed to solidify.

Pads constructed in accordance with the instant invention have many useful applications. They may be used to absorb vibrations of heavy machinery or fashioned to fit into and absorb vibratory motions of parts of machines such as shaft couplings. They may be suitably bonded to a substrate to perform as bumpers or absorbers in cargo vehicles, on loading docks, loading equipment, boat docks, automobile garages, automobile safety padding, etc. The pads are useful as gymnastic mats for karate and judo matches which require a firm flat surface that will distort only under blows received from the participants' elbows, knees or heads. The surface of a participant's elbow, knee or head acts as a quadric loading head and deforms the pad. Additionally, the structure may be used as a shoulder pad to absorb the recoil of firearms.

The above are only a few exemplary uses to which this invention may be directed.

What is claimed:

1. A compression energy-absorption structure comprising: a pair of sheets each having a thickness of about one thirty-second inches to one -eighth inch disposed in superposed spaced relationship, at least one of said sheets being of nonfiberous polymeric elastically stretchable material having a modulus of elasticity in the range of 3.2 to $3.3 \times 10^5$ pounds per square inch, said sheets being interconnected by a plurality of stiff resilient monofilaments terminally bonded to said sheets, each monofilament disposed in spaced-apart relationship from the other in substantially normal attitude to the surfaces of said sheets and having a length of at least one -half inch and a diameter of at least 0.005 inch.

2. The structure of claim 1 in which said sheets are substantially parallel with each other.

3. An energy-absorbing system comprising the structure of claim 2 in combination with a quadric loading head.

4. The structure of claim 1 in which said nonfiberous polymeric elastically stretchable sheet is shaped in convex contour.

5. An energy-absorbing system comprising the structure of claim 4 in combination with a planar loading head superimposed over at least a portion of said one sheet.

6. The structure of claim 1 in which said filament ends are embedded in said sheets.

7. A compression energy-absorption structure responsive to a compression force comprising: a pair of sheets disposed in spaced relationship, at least one of said sheets being of nonfiberous polymeric elastically stretchable material having a modulus of elasticity in the range of 3.2 to $3.5 \times 10^5$ pounds per square inch and capable of depressive penetration by stretching in a direction toward said other sheet in discrete progressive increments of the surface area of said polymeric sheet and of the depth of penetration to store energy exerted by said force, said sheets being interconnected by a plurality of monofilaments having a resistance to buckling in the range of 0.00031 to about 0.50 pounds per filament, the filaments terminally bonded to said sheets and oriented substantially normal to the surfaces of said sheets, said monofilaments capable of buckling in a consecutive order substantially coextensive with the depressively penetrable surface area of said polymeric sheet for absorbing energy exerted by said force.

8. The structure of claim 7 in which said monofilaments are bonded to said sheets in a density within the range of about 250 to 2,000 monofilaments per square inch of sheet surface.

9. The structure of claim 7 in which said stretchable sheet has an elongation of up to 20 percent when stretched in depressive penetration.

10. The structure of claim 7 in which said monofilaments have a slenderness ratio in the range of about 80 to about 800.

11. The structure of claim 8 in which the total energy capable of being stored by said polymeric sheet and absorbed by said filaments is equal to a compression force in the range of 10 to 900 pounds per square inch.

UNITED STATES PATENT OFFICE
CERTIFICATE OF CORRECTION

Patent No. 3,616,126          Dated October 26, 1971

Inventor(s) Barry F. Tungseth

It is certified that error appears in the above-identified patent and that said Letters Patent are hereby corrected as shown below:

In the specification:

Col. 4, line 15: "(1/k)" should be -- 1/k --

Col. 4, line 68: "-OD695" should be -- #D695 --

Col. 6, last figure in Table II: "10.9" should be -- 10.0 --

Signed and sealed this 9th day of May 1972.

(SEAL)
Attest:

EDWARD M. FLETCHER, JR.          ROBERT GOTTSCHALK
Attesting Officer                   Commissioner of Patents